2,921,357
Patented Jan. 19, 1960

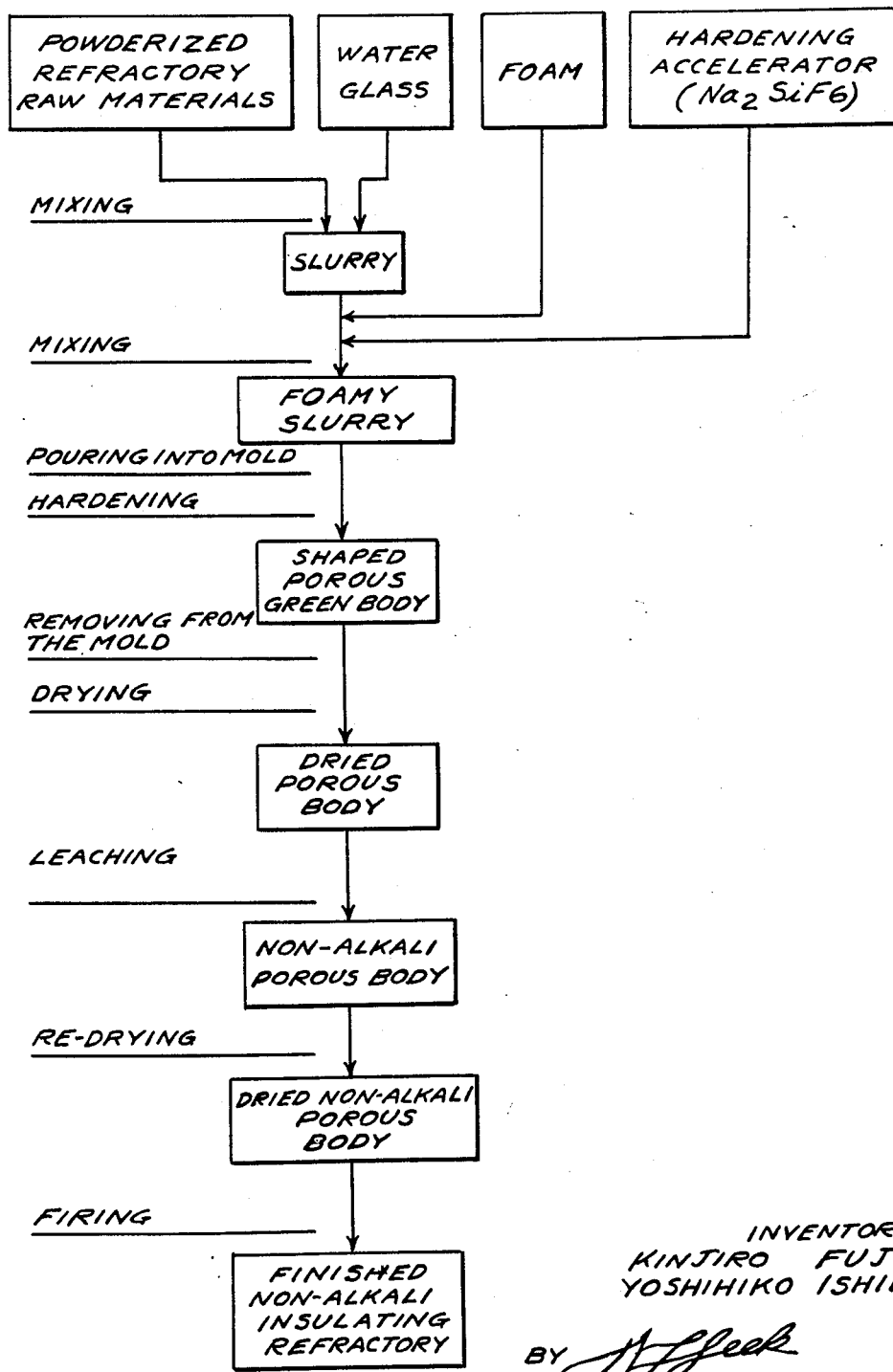

2,921,357
METHOD FOR MAKING INSULATING REFRACTORIES

Kinjiro Fujii, Shinjuku-ku, Tokyo-to, and Yoshihiko Ishido, Nakameguro, Meguro-ku, Tokyo-to, Japan Application November 28, 1955, Serial No. 549,532

Claims priority, application Japan December 6, 1954

6 Claims. (Cl. 25—156)

This invention relates to improved heat insulating refractories having superior heat insulating and refractory properties and to a process for preparing the same.

The methods generally used heretofore for making insulating refractories are: (1) blending combustible materials such as sawdust with fire clay or other refractory materials, or adding combustible materials to a mixture of fire clay and diatomaceous earth, and shaping this mixture by subjecting the mixture to pressure under a slightly moist condition and then firing at high temperature after drying to burn away the combustible materials contained therein, and (2) mixing and stirring the foam obtained from a suitable foaming agent such as surface active agents with the slurry prepared from water and fire clay or other refractory materials, and adding thereto bonding material such as plaster of Paris, magnesia cement or Portland cement, and shaping this mixture by pouring it into a mould and allowing it to set, and then burning the dried shaped mass. In the former process it is difficult to obtain a product having both excellent heat insulating properties and high refractoriness because low bulk density refractories having superior heat insulating qualities, are difficult to obtain unless lightweight materials such as diatomaceous earth are blended to the mixture. On the other hand when adding such materials as diatomaceous earth a decrease in refractoriness is unavoidable. In the latter process, a shaped green body having a satisfactory mechanical strength cannot be obtained due to the decreased bonding power of plaster of paris or magnesia cement which results from diluting such cements with foam, water or powderized raw materials in the slurry. Therefore, industrial production is difficult under this process owing to the fact that the shaped green body will be easily damaged in the drying and firing steps which follow the shaping step.

An object of the present invention is to provide a process for producing superior insulating refractories has been discovered which overcomes the above disadvantages. Another object of the present invention is to provide novel insulating refractories having superior insulating properties and high refractoriness which are made from ordinary refractory materials. It is also an object of this invention to provide cellular products for filtering and a process for their preparation. In one embodiment of the present invention the slurry is made by adding high siliceous water glass (molar ratio of silica to alkali above 2) to powderized refractory raw materials such as siliceous materials, zirconium containing materials, magnesia or their mixtures with or without blending auxiliary admixing materials such as lime stone, Feldspar, iron oxide, to facilitate the sintering. Foam which is prepared from a foaming agent such as salt surface active agents 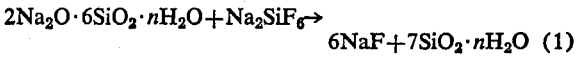 and others is added to said slurry and this mixture is stirred. A hardening accelerator for high siliceous water glass, for example alkali fluosilicate, calcium or aluminum sulfide, primary alkali phosphate, light burned magnesia 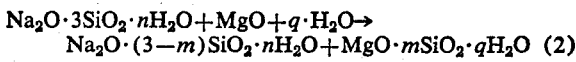 or the like is further added to said slurry and this mixture is poured into a mould for shaping and left to harden. The setting time is regulated by the quantity of the accelerator or the curing temperature. The whole mass will set in several hours to a hardness such that it can be removed from the mould. After drying, the green body thus obtained is washed with water to remove the soluble alkali from the mass, with or without previous treatment with an acid or an aqueous acid solution such as calcium salt, magnesium salt, iron salt, aluminum salt or the like. Then by again drying and firing said green body, the insulating refractory is produced.

Water glass can be maintained in a stable state when the molar ratio of silica to alkali does not exceed the maximum of 4:1. When the ratio exceeds 4:1 water glass becomes unstable. Consequently, the addition of mild alkali-reactive substances to high siliceous water glass causes the gradual separation of silica gel resulting in solidification of the water glass. For example, when a small amount of sodium fluosilicate is added to water glass, said water glass will harden at room temperature according to the following reaction formula:

$$2Na_2O \cdot 6SiO_2 \cdot nH_2O + Na_2SiF_6 \rightarrow$$
$$6NaF + 7SiO_2 \cdot nH_2O \quad (1)$$

On the other hand, the addition of silica-reactive substances causes the gradual formation of insoluble hydrosilicate while lowering the silica-alkali molar ratio. For instance, when partially burned magnesia is added to water glass, said water glass will harden according to the following reaction formula.

$$Na_2O \cdot 3SiO_2 \cdot nH_2O + MgO + q \cdot H_2O \rightarrow$$
$$Na_2O \cdot (3-m)SiO_2 \cdot nH_2O + MgO \cdot mSiO_2 \cdot qH_2O \quad (2)$$

Based on these reactions a shaped green body having sufficient mechanical strength to overcome the aforementioned defects is obtainable due to the fact that water glass which is the dispersion medium of the slurry will also harden. However, the alkali content of the water glass, and the surface active agent remain in the green body in the form of salts amounting to approximately 2–5% of $Na_2O$ (on a dry solids basis after firing to remove volatile components) which is enough to cause serious lowering of the refractoriness. An experiment showed the formation of liquid phase at about 900° C. and the shaped body was easily deformed under compression even at such a low temperature.

The hardening of the slurry is based on the above reaction Formulae 1 and 2 which show that the alkali contents are mostly in the form of soluble salts. Therefore the washing operation can be most effectively used to remove the alkali from the green body and furthermore the high porosity of said green body improves the effectiveness of the washing. Before carrying out the washing operation, the green body may be subjected to the acid treatment in order to change the alkali into a much more soluble form such as chloride or sulfate or subjected to the salt solution treatment, for example with calcium, magnesium, iron or aluminum salt solutions in order to form the insoluble silicates of these metal ions and to facilitate sintering at the firing step.

In order to further illustrate this phase of the present invention, reference is made to the following examples:

Example 1

800 grams of powderized diaspore and 40 grams of limestone are mixed with 380 grams of 25% water glass (molar ratio—$SiO_2:Na_2O=3.31:1$) and then previously prepared foam made from soap is mixed therewith bringing the bulk density of the resulting dried green body to about 0.5. The 20 grams of sodium fluosilicate is added to this mixture. After stirring said mixture for a short period, this foamy mixture is poured into a mould and left to set. After a few hours the obtained green body is taken out from the mould, dried at 110° C., washed with water, dried again at 110° C. and fired at SK 18. The insulating refractory product has the following physical properties:

Refractoriness _____ SK 37.
Bulk density _____ 0.54.
Compressive strength _____ 22 kg./cm.².
Thermal conductivity _____ 0.12 Kcal./m.hr.° C. (at mean temperature of 200° C.).

*Example 2*

800 grams of powderized grog is mixed with 400 grams of the water glass in the first example and previously prepared foam made from soap is mixed therewith bringing the bulk density of the resulting dried green body to about 0.55. Then 17 grams of primary sodium phosphate is added to this mixture. After stirring said mixture for a short period, this mixture is poured into a mould and left to set. After a few hours, the resulting green body is taken out from the mould, dried at 110° C., washed with water, dried again at 110° C. and fired at SK 18. The insulating refractory product has the following physical properties:

Refractoriness _____ SK 33.
Bulk density _____ 0.63.
Compressive strength _____ 70 kg./cm.².
Thermal conductivity _____ 0.15 Kcal./m.hr. ° C. (at mean temperature of 200° C.).

The process of the present invention is illustrated in the accompanying drawing in which the figure is a flow sheet with self-explanatory legends showing the several steps in the process.

We claim:

1. A process for making an insulating refractory which comprises adding water glass, wherein the molar ratio of silica to alkali is from 2:1 to 4:1, to a powderized refractory material in an amount of about 50% on the weight of said powderized refractory material to form a slurry, then adding to said slurry a hardening accelerator for said water glass and foam prepared from foaming agents, said foam being added in an amount sufficient to give the dried green body formed subsequently a porosity of at least 50%, pouring the mixture of refractory material, water glass, hardening accelerator and foam so formed into a mould and allowing said mixture to form a porous green body, removing said green body from the mould and drying the same, washing said green body with water to remove the alkali contained therein, redrying the washed green body and firing the dried green body to form the refractory.

2. In a process as set forth in claim 1, the additional step of treating the dried green body with acid after removal from the mould and prior to the first washing step.

3. In a process as set forth in claim 1 the additional step of treating the dried green body after removal from the mould and prior to the first washing step with an aqueous salt solution.

4. A process for making insulating refractories as set forth in claim 1 in which the powderized refractory material is selected from the group consisting of siliceous materials, aluminous materials, clays, grogs, chrome oxide containing materials, zirconium containing materials, magnesia, and mixtures thereof.

5. The process for making insulating refractories as set forth in claim 1 in which a material selected from the group consisting of limestone, feldspar, iron oxide, or mixtures thereof, is added to the mixture in order to facilitate sintering in the firing step.

6. An insulating refractory comprising a fired body having a cellular structure containing at least 50% of open and interconnected pores, said insulating refractory being produced in accordance with claim 1.

References Cited in the file of this patent

UNITED STATES PATENTS

| | | |
|---|---|---|
| 1,317,524 | Robertson | Sept. 30, 1919 |
| 1,944,008 | Hobart | Jan. 16, 1934 |
| 1,998,686 | Parsons | Apr. 23, 1935 |
| 2,447,725 | Adams et al. | Aug. 24, 1948 |

FOREIGN PATENTS

| | | |
|---|---|---|
| 126,749 | Australia | Feb. 9, 1948 |
| 606,119 | Great Britain | Aug. 6, 1948 |